(12) United States Patent
Huang et al.

(10) Patent No.: US 11,791,860 B2
(45) Date of Patent: Oct. 17, 2023

(54) ULTRA COMPACT AND WIDE BAND FOLDED MARCHAND BALUN FOR MILLIMETER-WAVE AND BEYOND WIRELESS COMMUNICATION

(71) Applicant: SWIFTLINK TECHNOLOGIES INC., Richmond (CA)

(72) Inventors: Min-Yu Huang, Richmond (CA); Srinaga Nikhil Nallandhigal, Richmond (CA)

(73) Assignee: SWIFTLINK TECHNOLOGIES INC., Richmond, CA (US)

( * ) Notice: Subject to any disclaimer, the term of this patent is extended or adjusted under 35 U.S.C. 154(b) by 89 days.

(21) Appl. No.: 17/578,824

(22) Filed: Jan. 19, 2022

(65) Prior Publication Data

US 2023/0231594 A1    Jul. 20, 2023

(51) Int. Cl.
*H04B 1/40*    (2015.01)
*H01P 5/10*    (2006.01)

(52) U.S. Cl.
CPC .................... *H04B 1/40* (2013.01); *H01P 5/10* (2013.01)

(58) Field of Classification Search
CPC .................... H04B 1/40; H01P 5/10
See application file for complete search history.

(56) References Cited

U.S. PATENT DOCUMENTS

| 2007/0268106 A1 | 11/2007 | Lee et al. | |
| 2010/0231316 A1* | 9/2010 | Jiang | H03H 7/42 333/25 |
| 2012/0119845 A1* | 5/2012 | Lu | H01F 21/12 333/26 |
| 2013/0093530 A1* | 4/2013 | Chang | H01P 5/10 333/26 |
| 2014/0015621 A1* | 1/2014 | Tsai | H03H 7/42 333/32 |
| 2014/0197901 A1* | 7/2014 | Bishop | H01P 5/12 333/117 |

(Continued)

FOREIGN PATENT DOCUMENTS

| CN | 210926268 U | * 7/2020 |
| CN | 113594655 A | * 11/2021 |

(Continued)

*Primary Examiner* — Adam D Houston
(74) *Attorney, Agent, or Firm* — WOMBLE BOND DICKINSON (US) LLP

(57) ABSTRACT

A folded Marchand Balun includes a first, a second, a third port, and a first transmission line being folded into a first and second intermediate transmission lines, the first intermediate transmission line disposed on a first signal plane and electrically connected through metal vias to the second intermediate transmission line disposed on a second signal plane. The first transmission line has one end as the first port and an opposite end as an open circuit. The Balun includes a second transmission line disposed on the first signal plane and is adjacent to the first intermediate transmission line. The second transmission line has one end as the second port and an opposite end grounded. The Balun includes a third transmission line disposed on the second signal plane and adjacent to the second intermediate transmission line. The third transmission line has one end as the third port and an opposite end grounded.

20 Claims, 17 Drawing Sheets

(56) References Cited

U.S. PATENT DOCUMENTS

| | | | | |
|---|---|---|---|---|
| 2014/0368270 | A1* | 12/2014 | Bouisse | H03F 3/19 330/252 |
| 2017/0250668 | A1* | 8/2017 | Anegawa | H01P 5/10 |
| 2020/0119692 | A1* | 4/2020 | Inagaki | H03D 7/14 |
| 2020/0220243 | A1* | 7/2020 | Inagaki | H03H 7/425 |

FOREIGN PATENT DOCUMENTS

| | | | |
|---|---|---|---|
| CN | 115955215 A | * | 4/2023 |
| KR | 20110049634 A | * | 5/2011 |

* cited by examiner

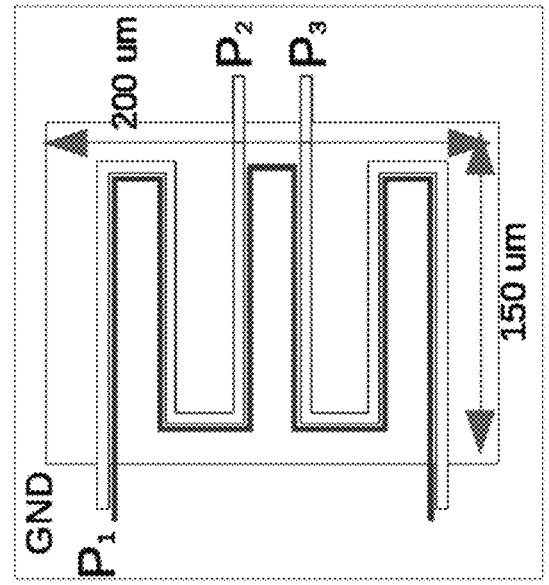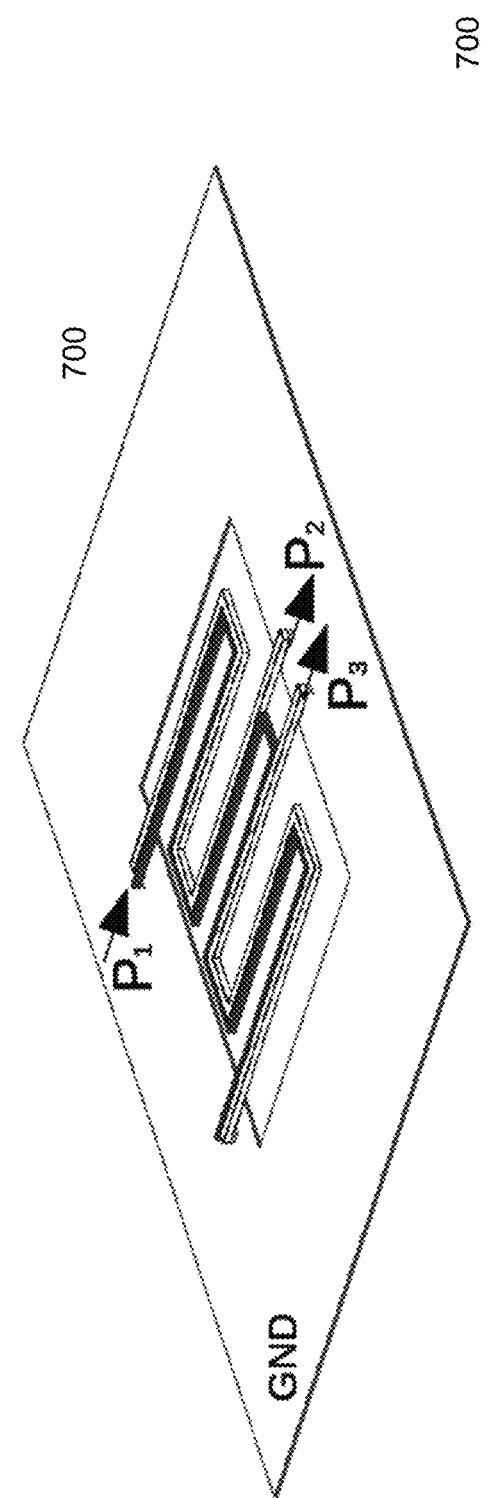
FIG. 7A
(Prior Art)
FIG. 7B
(Prior Art)

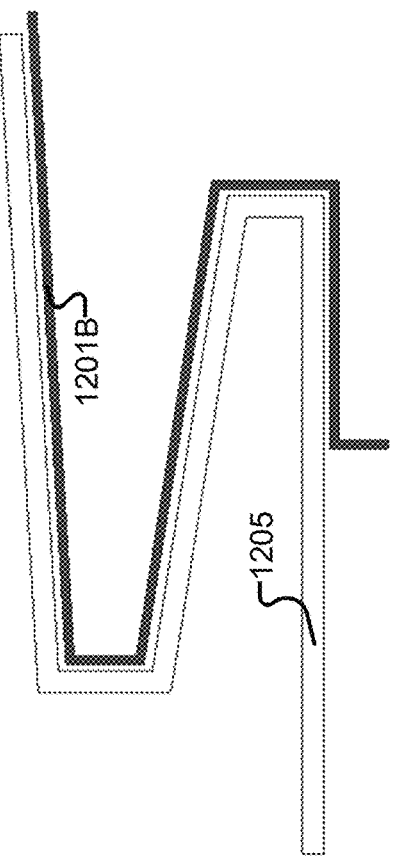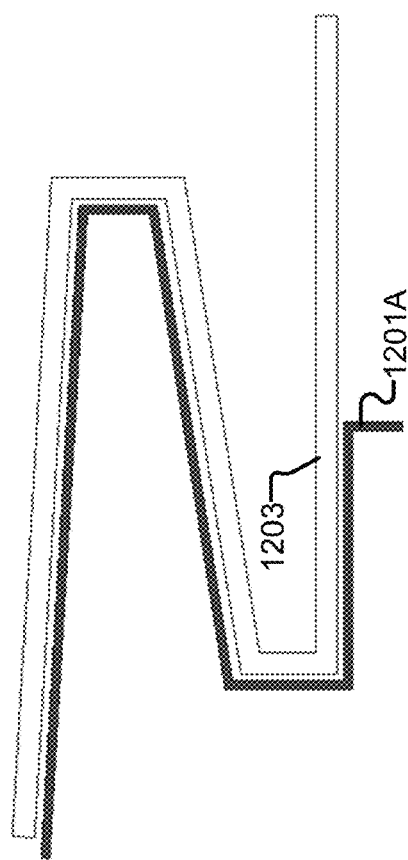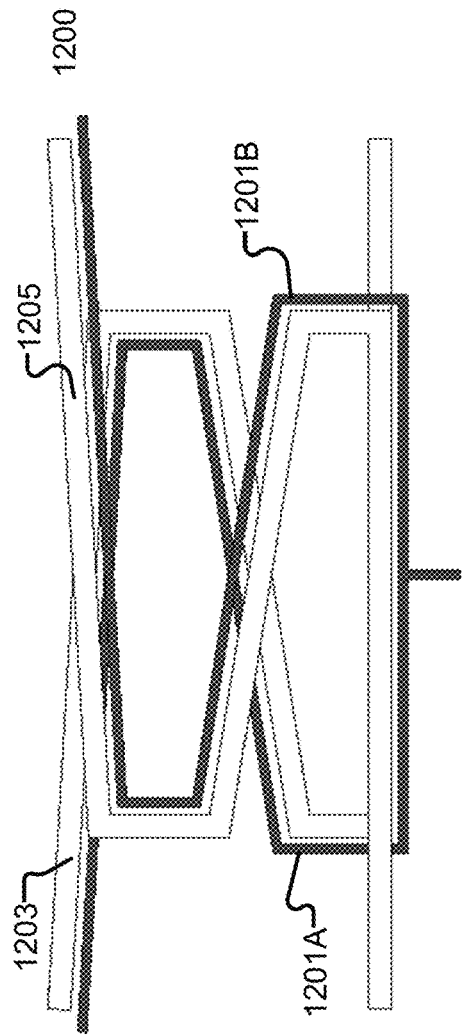

US 11,791,860 B2

ULTRA COMPACT AND WIDE BAND FOLDED MARCHAND BALUN FOR MILLIMETER-WAVE AND BEYOND WIRELESS COMMUNICATION

FIELD OF THE INVENTION

Embodiments of the present invention relate generally to wireless communication devices. More particularly, embodiments of the invention relate to ultra compact and wide band folded Marchand Baluns for millimeter-wave and beyond wireless communication.

BACKGROUND

With the persistent market demand for higher data rates, target precision, compact systems, and so on, wireless research is rapidly progressing to embrace the millimeter-wave (mmW) and beyond frequency bands. These bands are inherently capable of satisfying these requirements and thereby support the emerging applications such as 5G (fifth generation) new radio, automotive radar, mmW imaging, high speed indoor communications, and beyond.

Regardless of the technology in which these wireless systems are developed, the size of unavoidable passive components embedded in these wireless systems typically occupy a fairly large area than the active components. This increases a footprint of the systems and proportionally the cost.

One of the important passive components utilized in wireless systems is a Balun that converts the single-ended signal (unbalanced) to a differential signal (balanced) or vice versa. Since some of the front-end circuits in a typical wireless system rely on single-ended signals and others rely on differential signals, in this regard, the transformation between single-ended and differential signal and the corresponding Balun is an indispensable module in wireless systems.

BRIEF DESCRIPTION OF THE DRAWINGS

Embodiments of the invention are illustrated by way of example and not limitation in the figures of the accompanying drawings in which like references indicate similar elements.

FIGS. 7A-7B illustrates a perspective view and a top view of a Marchand Balun with meandering transmission lines.

FIG. 12A illustrates a top signal plane of a folded Marchand Balun, FIG. 12B illustrates a bottom signal plane of the folded Marchand Balun, FIG. 12C illustrates a top view of the folded Marchand Balun, according to one embodiment.

DETAILED DESCRIPTION

Figure 1:
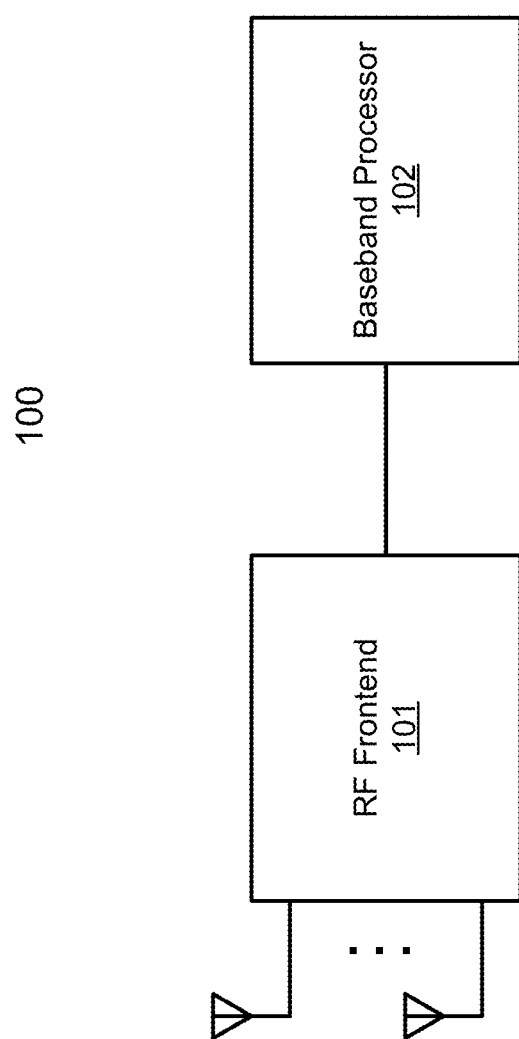
FIG. 1 is a block diagram illustrating an example of a wireless communication device according to one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Note that in the corresponding drawings of the embodiments, signals are represented with lines. Some lines may be thicker or have a slash over the lines, to indicate more constituent signal paths, such as a differential signal, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected, or an indirect connection through one or more passive or active intermediary devices. The term "magnetically coupled" or "inductively coupled" means a configuration between two conductors in such a way that change in current through one conductor induces a voltage across the ends of the other conductor through electromagnetic induction. The term "circuit" means one or more passive and/or active components that are arranged to cooperate with one another to provide a desired function. The term "signal" means at least one current signal, voltage signal or data/clock signal. The meaning of "a", "an", and "the" include plural references. The meaning of "in" includes "in" and "on".

As used herein, unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner. The term "substantially" herein refers to being within 10% of the target.

Embodiments of the specification disclose a folded Marchand Balun having a meandered primary and secondary transmission lines folded onto two or more metal layers to reduce the footprint and correspondingly the cost of the Balun.

Figure 6:
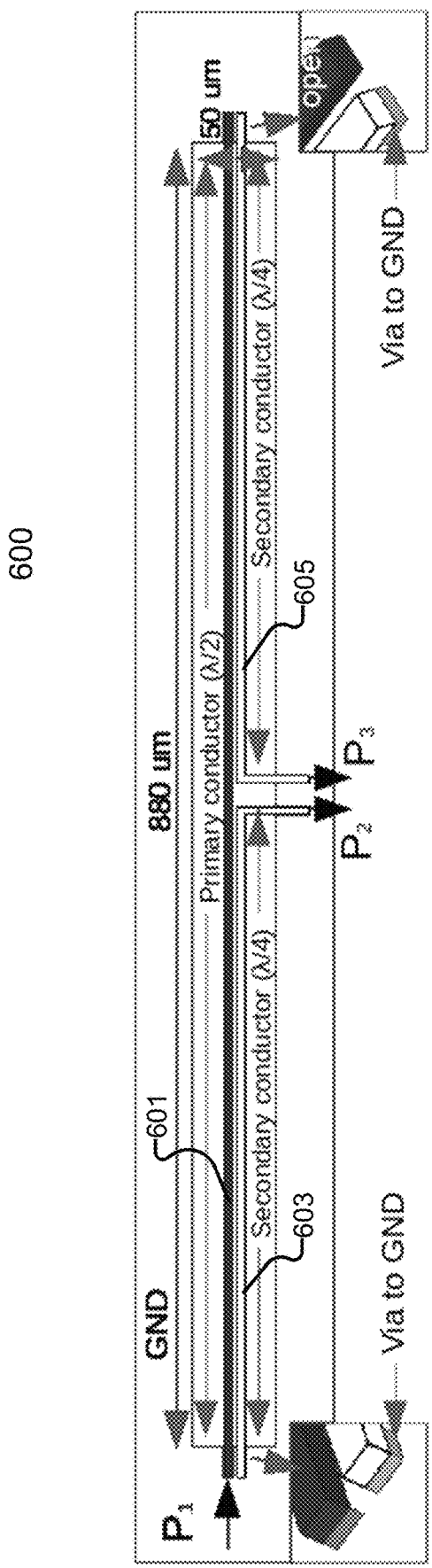
FIG. 6 illustrates a top view of a conventional Marchand Balun.

A Balun is a passive electrical component that allows balanced and unbalanced lines to be interfaced. Among different Balun configurations, Marchand Balun promises a wide-band response and is suitable for integration with radio frequency (RF) circuits, such as, amplifiers, mixers, antennas, impedance transformation circuits, etc. A layout of conventional Marchand Balun 600 is shown in FIG. 6, where the primary transmission line 601 with single-ended port ($P_1$) is a half-wavelength open circuit transmission line, and the electromagnetically coupled secondary transmission line (603, 605) are short circuited quarter-wavelength transmission lines with respective differential ports ($P_2$, $P_3$). In operation, the signal at the single-ended port $P_1$ is coupled to the two differential ports $P_2$ and $P_3$ with an approximately equal magnitude, while the differential ports have complementary signals that are 180 degrees out of phase. Although the conventional Marchand Balun 600 of FIG. 6 exhibits good Balun performance, it occupies a fairly large footprint.

For example, if Marchand Balun 600 of FIG. 6 is implemented for operation from 36 GHz (e.g., wavelength $\lambda_0$=8333 um) in Complementary Metal Oxide Semiconductor (CMOS) technology, the Marchand Balun 600 designed in a single metal layer would occupy an area of approximately 44,000 um$^2$ (880 um×50 um) or 0.00063$\lambda_0^2$. As shown in FIG. 6, a topmost metal layer is used for the transmission lines and the metal layers below are chosen as the ground plane. Note that, instead of a design specification at center frequency, a lowest operating frequency at 36 GHz ($\lambda_0$=8333 um) is referred as this defines the size of the Marchand Balun.

Figure 7C:
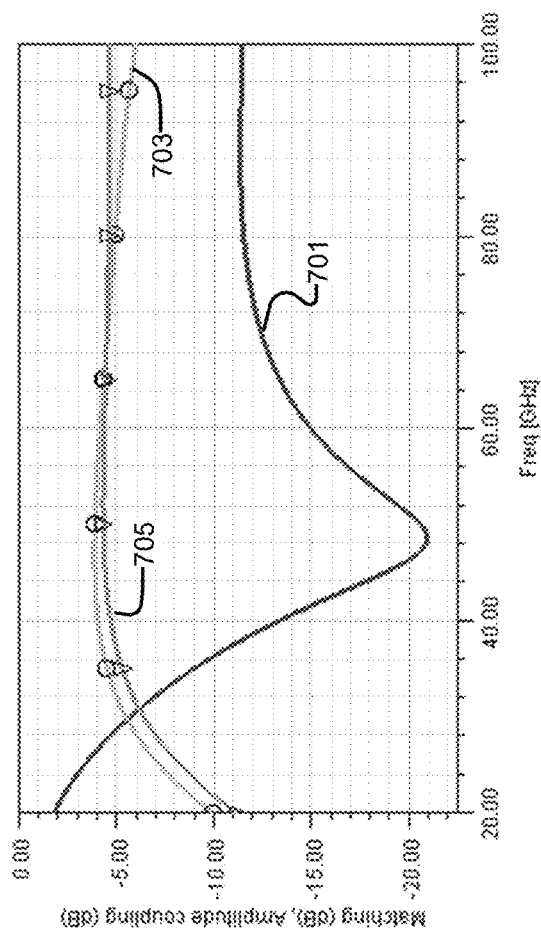
FIG. 7C illustrates matching at port $P_1$ and magnitude coupling from ports $P_1$ to $P_2$ and $P_3$ for the Marchand Balun of FIGS. 7A-7B.
Figure 7D:
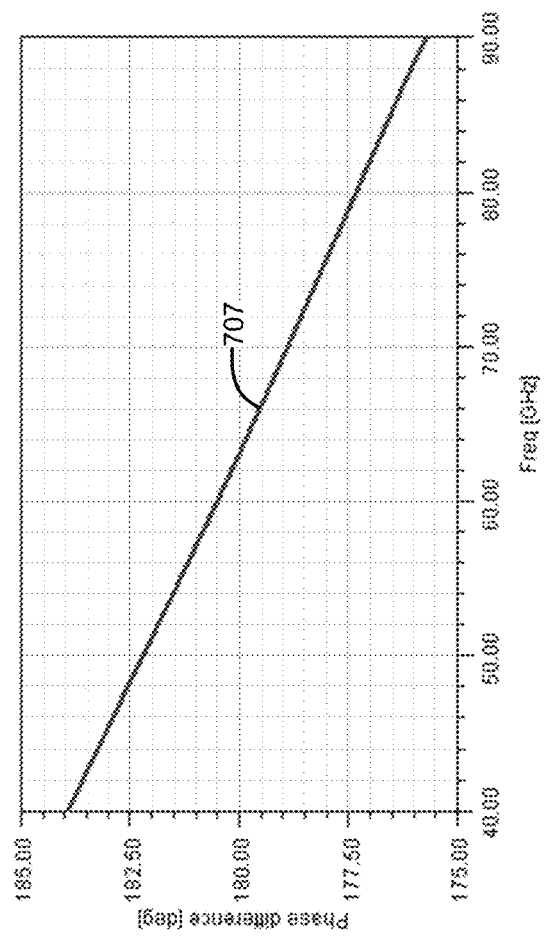
FIG. 7D illustrates phase difference at ports $P_2$ and $P_3$ for the Marchand Balun of FIGS. 7A-7B.

In some embodiments, meandering of the primary and/or electromagnetically coupled secondary transmission lines reduces the overall footprint of the conventional Marchand Balun. This meandering can be carried out by modeling the primary and secondary conductors on the same metal layer as shown in perspective and top views of FIGS. 7A and 7B respectively. The metal layers used for this meandered Marchand Balun 700 are same as the Marchand Balun 600. From simulations, the matching at $P_1$ (e.g., return loss $S_{11}$ parameter 701 for port $P_1$) and magnitude coupling from $P_1$ to $P_2$ (e.g., insertion loss $S_{21}$ parameter 703 for port $P_1$ to $P_2$) and from $P_1$ to $P_3$ (e.g., insertion loss $S_{31}$ parameter 705 for port $P_1$ to $P_3$) are shown in FIG. 7C. The phase difference 707 of the signal at $P_2$ and $P_3$ is shown in FIG. 7D. As shown in FIG. 7D, there exists minimal phase imbalance between the $P_2$ and $P_3$, e.g., deviations from the ideal 180 degrees over the useful frequency bands of 36 to 84 GHz.

The area occupied by the meandered Marchand Balun 700 configuration that is designed for operation from 36 GHz to 84 GHz requires a footprint of 30,000 um$^2$ (200 um×150 um) or 0.00043$\lambda_0^2$, which is approximately 30% less than that of conventional Marchand Balun 600 of FIG. 6. The compactness of meandered Marchand Balun 700 is realized at the expense of amplitude and phase imbalance as shown in FIGS. 7C-7D. Nevertheless, in embodiments disclosed further below, the size of meandered Marchand Balun 700 can be further reduced by folding the Marchand Balun structure over multiple layers.

According to a first aspect, a folded Marchand Balun includes a first, a second, and a third port. The folded Marchand Balun includes a first transmission line being folded into a first and a second intermediate transmission lines, the first intermediate transmission line disposed on a first signal plane and the second intermediate transmission line disposed on a second signal plane, where a first end of the first intermediate transmission line is coupled to the first port, a first end of the second intermediate transmission line is open circuit, and a second end of the first intermediate transmission line is coupled to a second end of the second intermediate transmission line through inter-plane vias. The folded Marchand Balun includes a second transmission line disposed on the first signal plane and is adjacent to the first intermediate transmission line, where an electromagnetic field generated by the first intermediate transmission line induces a signal in the second transmission line, where the second transmission line has one end coupled to the second port and an opposite end coupled to a reference plane. The folded Marchand Balun includes a third transmission line disposed on the second signal plane and is adjacent to the second intermediate transmission line, where an electromagnetic field generated by the second intermediate transmission line induces a signal in the third transmission line, where the third transmission line has one end coupled to the third port and an opposite end coupled to the reference plane. The folding of the primary and secondary transmission lines further reduces the footprint of the Marchand Balun with no significant compromise in performance. As a result, the folding and meandering configuration assists in lowering the overall area, and correspondingly, the cost of the Marchand Balun.

In one embodiment, the first port is a single-ended port of the folded Marchand Balun at the first signal plane, the reference plane is a ground for the single-ended port, and the second and third ports are differential ports of the folded Marchand Balun at the first and second signal planes, respectively.

In one embodiment, the first and second signal planes are interchangeable planes.

In one embodiment, the first transmission line is folded orthogonally, where the first intermediate transmission line is substantially orthogonal to the second intermediate transmission line to minimize a electromagnetic coupling between the first intermediate transmission line and the second intermediate transmission line. In one embodiment, the first intermediate transmission line is not orthogonal to the second intermediate transmission line. In one embodiment, the second transmission line is substantially orthogonal to the third transmission line.

In one embodiment, the first and second signal planes are metal layers of a first and a second respective height from the reference plane.

In one embodiment, the inter-plane vias comprise a metal via to electrical short the first intermediate transmission line at the first signal plane to the second intermediate transmission line at the second signal plane.

In one embodiment, the second transmission line is shorted to the reference plane through a first metal vias and the third transmission line is shorted to the reference plane through a second metal vias. In one embodiment, the second and third transmission lines are shorted through a common metal vias.

In one embodiment, the first intermediate transmission line is a portion of the first transmission line in a first orientation and the second intermediate transmission line is a remaining portion of the first transmission line that is folded vertically and rotated in a second orientation.

In one embodiment, the first transmission line and the second or third transmission lines are separated by a substrate to increase the electromagnetic coupling between the first transmission line and the second or third transmission lines.

In one embodiment, the first intermediate transmission line is of a first line width and the second and third transmission lines are of the first line width or a second line width, where the first intermediate transmission line is separated from the second transmission line by a first spacing and the second intermediate transmission line is separated from the third transmission line by the first spacing or a second spacing.

In one embodiment, the folded Marchand Balun is implemented in complementary metal oxide semiconductor, printed circuit board, or III-V (such as BN, BP, BAs, BSb, AlP, AlAs, AlSb, GaN, GaP, GaAs, GaSb, InAs, InN, InP, or InSb) fabrication technologies.

In one embodiment, the folded Marchand Balun is integrated to a mixer, amplifier, or a transmit/receive switch of a receive chain or a transmit chain of a radio frequency transceiver.

In one embodiment, the first transmission line is further folded to a third signal plane, wherein the first, second, and third signal planes are a subset of a plurality of signal planes where the first transmissions line is folded.

In one embodiment, the folding of the first transmission line is used to match an impedance at the first or the second and third ports of the folded Marchand Balun for an operating frequency.

According to a second aspect, a radio frequency (RF) transceiver includes an antenna, one or more differential transmit (Tx) components, one or more differential receive (Rx) components, a transmit/receive switch having a first port coupled/connected to the antenna, a first folded Marchand Balun, and a second folded Marchand Balun. The first Marchand Balun having a single-ended port connected to a second port of the transmit/receive switch, and differential ports integrated with the one or more Rx components. The second folded Marchand Balun having a single-ended port connected to a third port of the transmit/receive switch, and differential ports integrated with the one or more Tx components. The first or/and second folded Marchand Balun includes a first, a second, and a third port, a first transmission line being folded into a first and a second intermediate transmission lines, the first intermediate transmission line disposed on a first signal plane and the second intermediate transmission line disposed on a second signal plane, where a first end of the first intermediate transmission line is coupled to the first port, a first end of the second intermediate transmission line is open circuit, and a second end of the first intermediate transmission line is coupled to a second end of the second intermediate transmission line through inter-plane vias. The first or/and second folded Marchand Balun includes a second transmission line disposed on the first signal plane and is adjacent to the first intermediate transmission line, where an electromagnetic field generated by the first intermediate transmission line induces a signal in the second transmission line, where the second transmission line has one end coupled to the second port and an opposite end coupled to a reference plane. The first or/and second folded Marchand Balun includes a third transmission line disposed on the second signal plane and is adjacent to the second intermediate transmission line, where an electromagnetic field generated by the second intermediate transmission line induces a signal in the third transmission line, where the third transmission line has one end coupled to the third port and an opposite end coupled to the reference plane.

According to a third aspect, a radio frequency (RF) frontend circuit includes a digital signal processing unit, and a transceiver coupled to the digital signal processing unit to transmit and receive signals to and from the digital signal processing unit. The transceiver includes an antenna, one or more differential transmit (Tx) components, one or more differential receive (Rx) components, a transmit/receive switch having a first port coupled/connected to the antenna, a first folded Marchand Balun, and a second folded Marchand Balun. The first folded Marchand Balun having a single-ended port coupled to a second port of the transmit/receive switch, and differential ports coupled to the one or more Rx components. The second folded Marchand Balun having a single-ended port coupled to a third port of the transmit/receive switch, and differential ports coupled to the one or more Tx components. The first or/and second folded Marchand Balun includes a first, a second, and a third port, a first transmission line being folded into a first and a second intermediate transmission lines, the first intermediate transmission line disposed on a first signal plane and the second intermediate transmission line disposed on a second signal plane, where a first end of the first intermediate transmission line is coupled to the first port, a first end of the second intermediate transmission line is open circuit, and a second end of the first intermediate transmission line is coupled to a second end of the second intermediate transmission line through inter-plane vias. The first or/and second folded Marchand Balun includes a second transmission line disposed on the first signal plane and is adjacent to the first intermediate transmission line, where an electromagnetic field generated by the first intermediate transmission line induces a signal in the second transmission line, where the second transmission line has one end coupled to the second port and an opposite end coupled to a reference plane. The first or/and second folded Marchand Balun includes a third transmission line disposed on the second signal plane and is adjacent to the second intermediate transmission line, where an electromagnetic field generated by the second intermediate transmission line induces a signal in the third transmission line, where the third transmission line has one end coupled to the third port and an opposite end coupled to the reference plane.

FIG. 1 is a block diagram illustrating an example of a wireless communication device according one embodiment of the invention. Referring to FIG. 1, wireless communication device 100, also simply referred to as a wireless device, includes, amongst others, an RF frontend module 101 and a baseband processor 102. Wireless device 100 can be any kind of wireless communication devices such as, for example, mobile phones, laptops, tablets, network appliance devices (e.g., Internet of thing or IOT appliance devices), etc.

In a radio receiver circuit, the RF frontend is a generic term for all the circuitry between the antenna up to and including the mixer stage. It consists of all the components in the receiver that process the signal at the original incoming radio frequency, before it is converted to a lower frequency, e.g., IF. In microwave and satellite receivers it is often called the low-noise block (LNB) or low-noise downconverter (LND) and is often located at the antenna, so that the signal from the antenna can be transferred to the rest of the receiver at the more easily handled intermediate frequency. A baseband processor is a device (a chip or part of a chip) in a network interface that manages all the baseband processing functions to process baseband signals.

In a radio transmitter circuit, the RF frontend is a generic term for all the circuitry between the mixer stage up to and including the antenna. It consists of all the components in the transmitter that processes the signal at the more easily handled intermediate frequency, IF, before it is converted to a radio frequency, e.g., RF, for transmission. In microwave and satellite transmitters it is often called the block upconverter (BUC), which makes up the "transmit" side of the system, and is often used in conjunction with an LNB, which makes up the "receive" side of the system.

In one embodiment, RF frontend module 101 includes one or more RF transceivers, where each of the RF transceivers transmits and receives RF signals within a particular frequency band (e.g., a particular range of frequencies such as non-overlapped frequency ranges) via one of a number of RF antennas. The RF frontend IC chip further includes an IQ generator and/or a frequency synthesizer coupled to the RF transceivers. The IQ generator or generation circuit generates and provides an LO signal to each of the RF transceivers to enable the RF transceiver to mix, modulate, and/or demodulate RF signals within a corresponding frequency band. The RF transceiver(s) and the IQ generation circuit may be integrated within a single IC chip as a single RF frontend IC chip or package.

Figure 2:
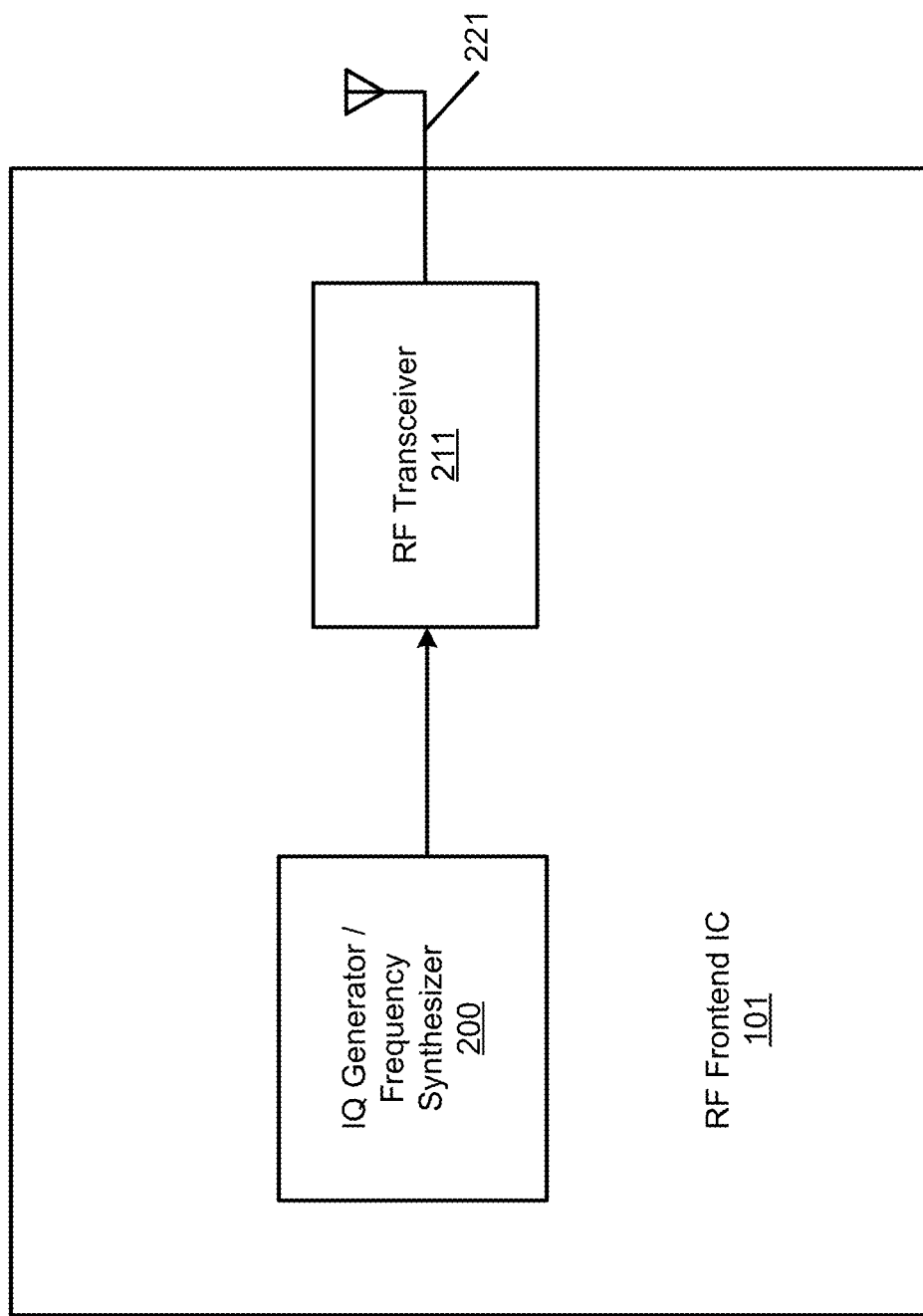
FIG. 2 is a block diagram illustrating an example of an RF frontend integrated circuit according to one embodiment.

FIG. 2 is a block diagram illustrating an example of an RF frontend integrated circuit according to one embodiment of the invention. Referring to FIG. 2, RF front-end 101 includes, amongst others, an IQ generator and/or frequency synthesizer 200 coupled to a RF transceiver 211. Transceiver 211 is configured to transmit and receive RF signals within one or more frequency bands or a broad range of RF frequencies via RF antenna 221. In one embodiment, transceiver 211 is configured to receive one or more LO signals from frequency synthesizer 200. The LO signals are generated for the one or more corresponding frequency bands. The LO signals are utilized to mix, modulate, demodulated by the transceiver for the purpose of transmitting and receiving RF signals within corresponding frequency bands. Although there is only one transceiver and antenna shown, multiple pairs of transceivers and antennas can be implemented, one for each frequency bands.

Figure 3:
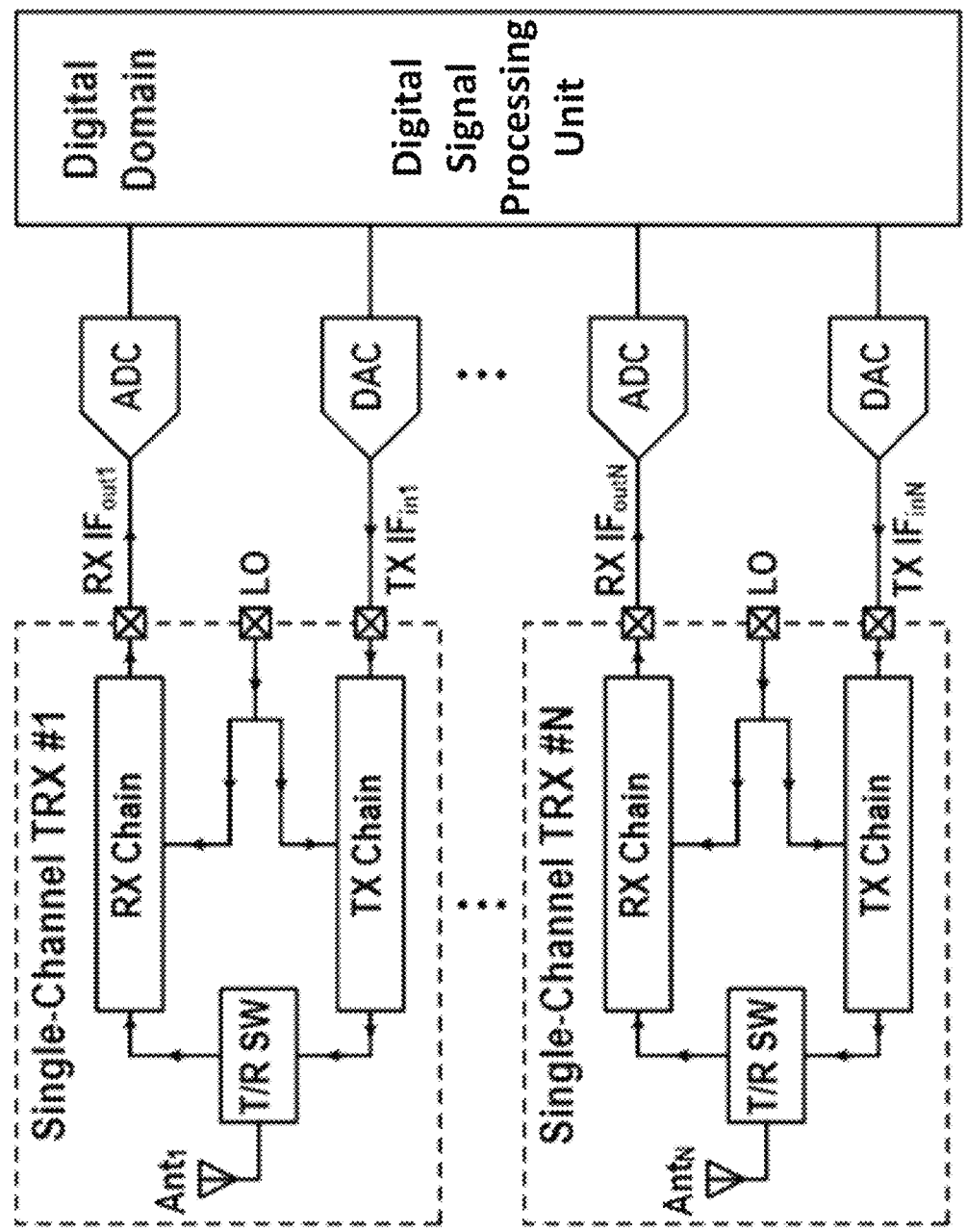
FIG. 3 is a block diagram illustrating an example of a transceiver according to one embodiment.

FIG. 3 is a block diagram illustrating an example of a transceiver according to one embodiment. Transceiver 300 may represent RF transceiver 211 of FIG. 2. Referring to FIG. 3, transceiver 300 includes a number of single-channel transceivers (e.g., single-channel TRX #1 . . . single-channel TRX #N), analog-digital converters (ADCs), digital-analog converters (DACs), and a digital signal processing unit. The digital signal processing unit can process digital signals in a digital domain. The single-channel transceivers each can include an up-conversion TX chain, a down-conversion RX chain, a T/R switch, and an antenna. The single-channel transceivers can each receive/transmit a respective analog stream simultaneously from/to one or more remote devices (e.g., a cellular mobile device, user equipment, and/or a cellular mobile device site) independent of the rest of the single-channel transceivers. Each of the ADCs can convert an analog signal to a digital signal. Each of the DACs can convert a digital signal to an analog signal. As shown, pairs of ADCs and DACs are coupled to each one of the single-channel transceivers to convert data streams from/to an analog domain to/from the digital domain. In one embodiment, the DSP unit is configured to generate a first set of digital data streams simultaneously and each of the first set of digital data streams is converted by a respective one of the DACs into an analog data stream to be transmitted to a remote device by a respective one of the single-channel transceiver.

In one embodiment, the single-channel transceivers, e.g., single-channel TRX #1 . . . single-channel TRX #N, have identical channels. In one embodiment, the RF front-end circuit is part of a cellular handheld user mobile device. In another embodiment, the RF frontend circuit is part of a cellular mobile device site which can stream data to one or more cellular handheld user mobile devices. In another embodiment, the identical channels can stream data to one or more cellular handheld user mobile devices by transmitting and receiving a respective independent data streams.

In one embodiment, the single-channel transceivers each can include an antenna which can include a directional antenna. The directional antenna of each of the single-channel transceivers can correspond to a different radiation angle or a similar radiation angle in comparison with the other directional antennas of the RF frontend. For example, different radiation angles can track a user moving within many corresponding radiation angles while similar radiation angles can track two or more users moving within a corresponding radiation angle or similar radiation angles.

In one embodiment, the DSP unit is further configured to receive a second set of digital data streams from the ADCs. In one embodiment, each of the second set of digital data streams is received by a respective one of the single-channel transceiver via a specific radiation angle. In one embodiment, the second set of digital data streams can be received simultaneously. In one embodiment, the second set of digital data streams are synchronized in time. In one embodiment, the first set of digital streams are synchronized in time.

Figure 4:
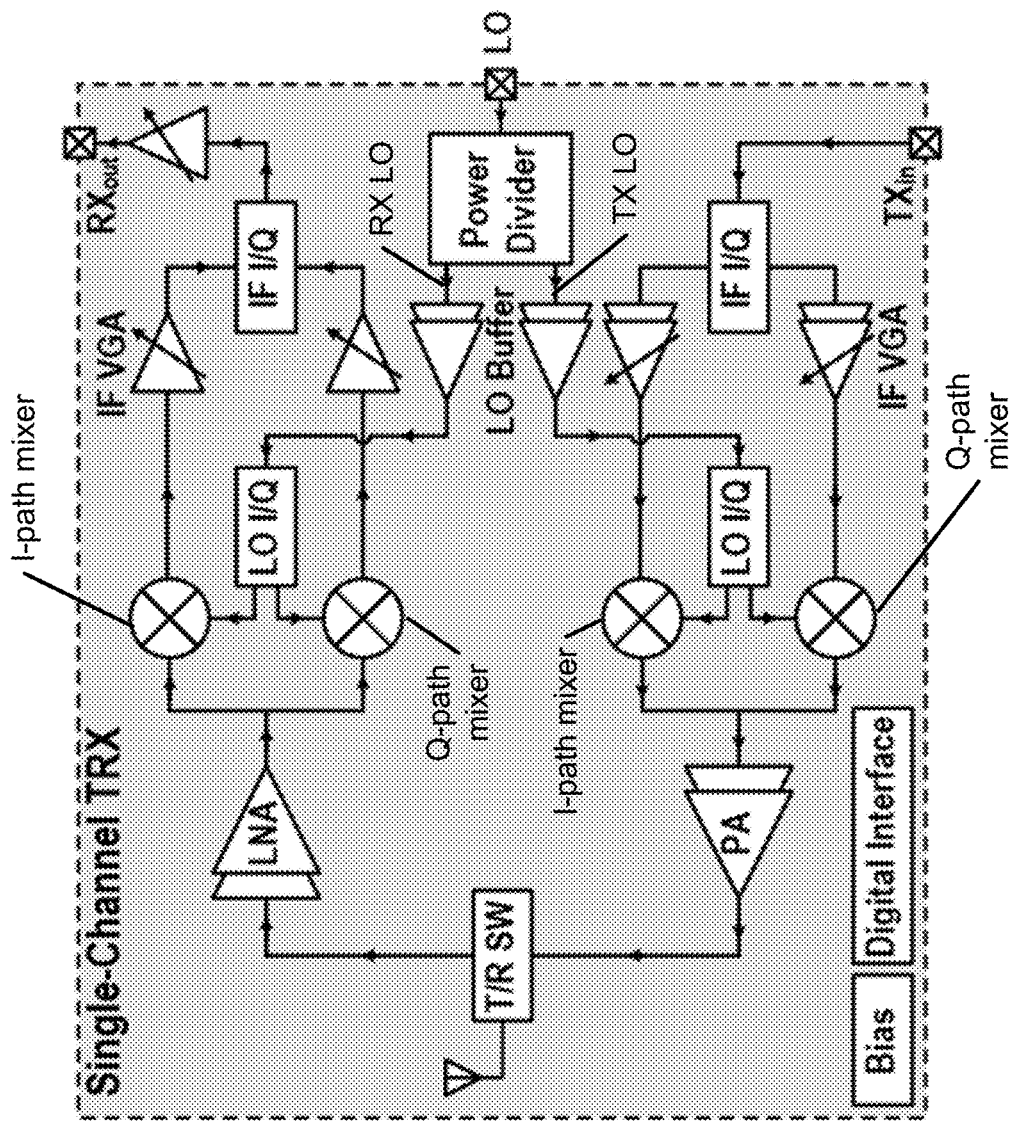
FIG. 4 is a block diagram illustrating an example of a single-channel transceiver circuit according to one embodiment.

FIG. 4 is a block diagram illustrating an example of a single-channel transceiver circuit according to one embodiment. Referring to FIG. 4, single-channel transceiver 400 may represent single-channel TRX #1 of FIG. 3. Transceiver 400 is configured to transmit/receive RF signals for a single-channel. The single-channel can be a single frequency channel. In one embodiment, in the TX chain, transceiver 400 can include a power amplifier (PA), in-phase/quadrature (I/Q) up-conversion mixer(s), a local oscillator (LO) buffer, a LO I/Q generation network, IF variable-gain amplifiers (VGAs), and an IF I/Q generation network.

The TX chain can include two paths, 1) I path for processing in-phase component signals and 2) Q-path for processing quadrature component signals. In one embodiment, IF I/Q quadrature network can generate a I component signal and a Q component signal based on an intermediate signal to be transmitted (e.g., TXin signal). The I and Q component signals can be further amplified by IF VGA. Up-conversion mixers for each of the I-path and the Q-path receives the amplified I and Q component signals and the LO I/Q signals (generated by the LO I/Q generation network based on an TX LO signal) and mixes/modulates the IF I/Q-path component signals to a higher frequency band. The higher frequency I and Q component signals are then recombined and amplified by the PA before being transmitted to the antenna via a T/R switch to be radiated by the antenna.

In one embodiment, for the RX chain, transceiver 400 can include a low-noise amplifier (LNA), I/Q down-conversion mixer(s), a LO buffer, an LO I/Q quadrature generation network, an IF I/Q quadrature generation network, and IF VGAs. The TX chain and RX chain can be coupled by a T/R switch, which is coupled to the antenna. Similar to the TX chain, the RX chain can include two paths, 1) I path for processing in-phase component signals and 2) Q-path for processing quadrature component signals. In one embodiment, the RX chain receives an RF signal, via the antenna, from a remote device and the RF signal is amplified by the LNA (which may or may not include a band pass filter). The I-path down-convert mixer and the Q-path down-convert mixer mixes/demodulates the RF signal into I-path signals and Q-path signals using the LO I/Q components (e.g., generated by LO I/Q generation network based on an RX LO signal). The I-path and Q-path signals can be further amplified by I-path and Q-path IF VGAs. The IF I/Q quadrature generation network can then generate an RXout signal based on the amplified I-path and Q-path signals. In one embodiment, the RXout signal may be further amplified by additional amplifiers or VGAs.

In one embodiment, the TX LO and RX LO signals are generated by an on-chip LO power divider using an LO signal. The LO signal may be provided by a crystal oscillator. In one embodiment, the TX LO and RX LO signals are buffered by LO buffers. In one embodiment, the single-channel TRX includes a bias interface which can provide bias voltage sources for the single-channel TRX. In another embodiment, a pair of ADC and DAC are integrated with the single-channel TRX and the single-channel TRX can include a digital interface to interface with the digital domain of a digital signal processing unit (such as the digital signal processing unit of FIG. 3).

In some embodiments, the circuit blocks (mixers, LNA, PA, IF VGA, etc.) of transceiver 400 are single-ended units. In some embodiments, the circuit blocks (mixers, LNA, PA, IF VGA, etc.) of transceiver 400 are differential units. Instead of singled-ended signals that is referenced to a fixed potential (ground), differential circuits use differential signals, that are measured between two nodes that have equal and opposite signal excursions about a fixed potential. Differential signals can reject common noise from environment and the power supply providing resilience to the transceiver circuit blocks.

Figure 5A:
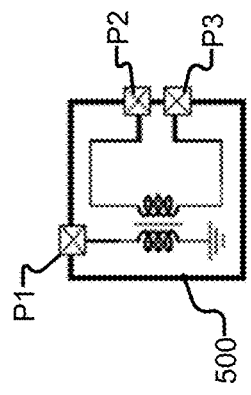
FIG. 5A illustrates a circuit diagram of a Balun.

A Balun can interface single-ended signals to differential signals, and vice versa. FIG. 5A illustrates a circuit diagram of a Balun 500. The circuit diagram illustrates Balun 500 having three ports. The single-ended port $P_1$ is connected to a primary winding. The primary winding is electromagnetically coupled to second winding, and the second winding are connected to differential ports $P_2$ and $P_3$. An implementation of a conventional Marchand Balun using transmission lines are shown in FIG. 6 and FIGS. 7A-B.

Figure 5B:
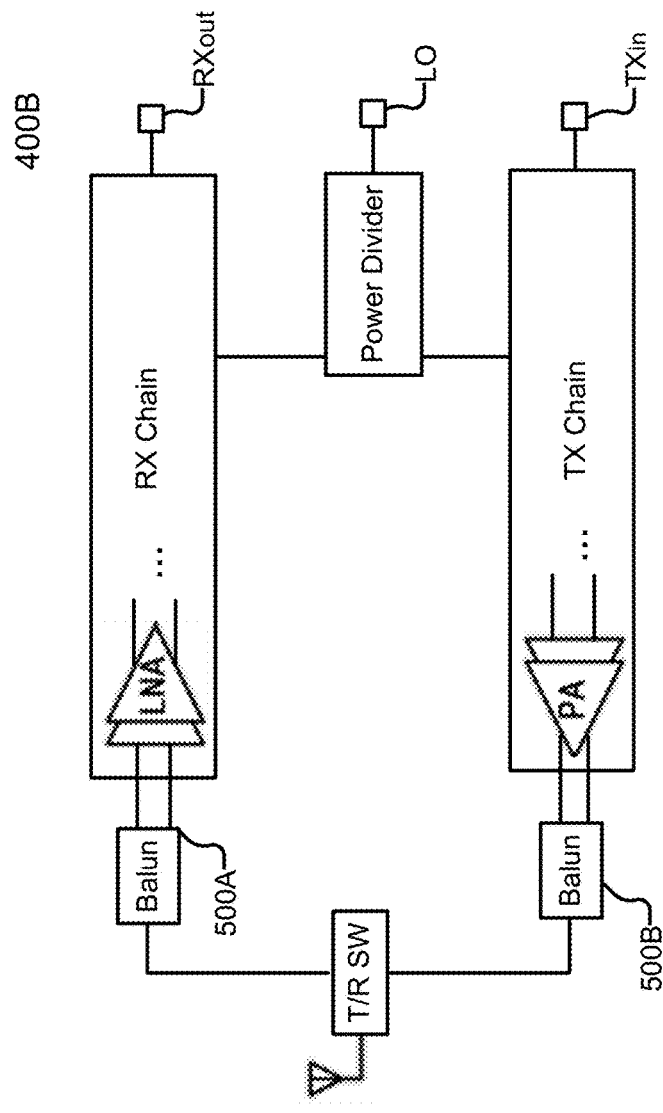
FIG. 5B is a block diagram illustrating an example of a single-channel transceiver circuit according to one embodiment.

FIG. 5B is a block diagram illustrating an example of a single-channel transceiver circuit 400B according to one embodiment. Single-channel transceiver 400B can represent transceiver 400 of FIG. 4, but with balanced (differential) circuit components. Balanced circuit components be highly resilient against environmental and power supply noise. For example, transceiver 400B can include balanced up-conversion TX chain, a balanced down-conversion RX chain, and/or T/R switch.

Transceiver 400B can be configured to transmit/receive RF signals from an antenna for a single-channel. The single-channel can be a single frequency channel. In one embodiment, in the balanced TX chain having balanced circuit components, a differential signal can be amplified by a balanced PA. The amplified differential signal can be converted to singled-ended signal by Balun 500B. The singled-ended signal is sent as a RF signal over the air to a receiving unit (not shown), via the antenna. In one embodiment, in the balanced RX chain having balanced circuit components, an RF signal can be received from a sending unit (not shown), via the antenna. The received RF signal can then be converted from single-ended to balanced (or differential) signal by Balun 500A. The balanced signal is then amplified by a balanced LNA of the balanced RX chain. Thus, instead of singled-ended signals that is referenced to a fixed potential (ground), differential signals are used by balanced RX and/or TX components at the balanced RX and/or TX chains.

In one embodiment, the T/R switch is a balanced T/R switch (T/R switch and Baluns 500A-B), as illustrated by FIG. 5B. In this case, T/R switch provides differential signal to balanced LNA of the RX chain and receives differential signal from balanced PA of the TX chain. Although the Baluns are shown coupled to the balanced TX and RX chains, any subset of the components (T/R switch, LNA, PA, mixers, VGA, etc.) in the TX and/or RX chains can be balanced, and Balun 500 can be coupled to the subsets of balanced circuit components to convert single-ended signals to differential signals, or vice versa. Implementations of different configurations of a Marchand Balun is further disclosed in FIGS. 7A-12D.

Marchand Baluns have a wide-band response and are suitable for integration with RF components, including amplifiers, mixers, antennas, and impedance matching circuits, etc. For a Marchand Balun, the primary transmission line has to electromagnetically couple efficiently with corresponding secondary transmission lines and minimally electromagnetically couple with itself to achieve desirable performances. In the case of a folded configuration, a horizontal folding of a top half over the bottom half of a Marchand Balun, such as meandered Marchand Balun 700 in FIG. 7A, will result in significant self-coupling, e.g., electromagnetic coupling between a same transmission line. In this regard, an orthogonal folding approach is proposed which exhibits minimal electromagnetic coupling between the same transmission lines. It is known that orthogonal electromagnetic fields ideally do not couple amongst each other and, thus, would achieve a maximum amount of isolation for any layout arrangements.

Figure 8B:
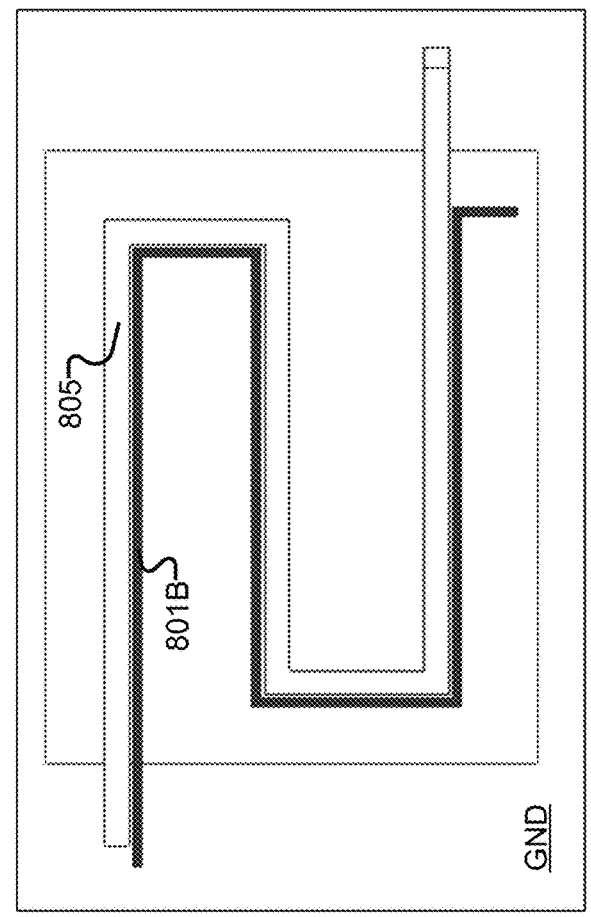
FIG. 8B illustrates the reference plane and a bottom signal plane of the folded Marchand Balun.
Figure 8A:
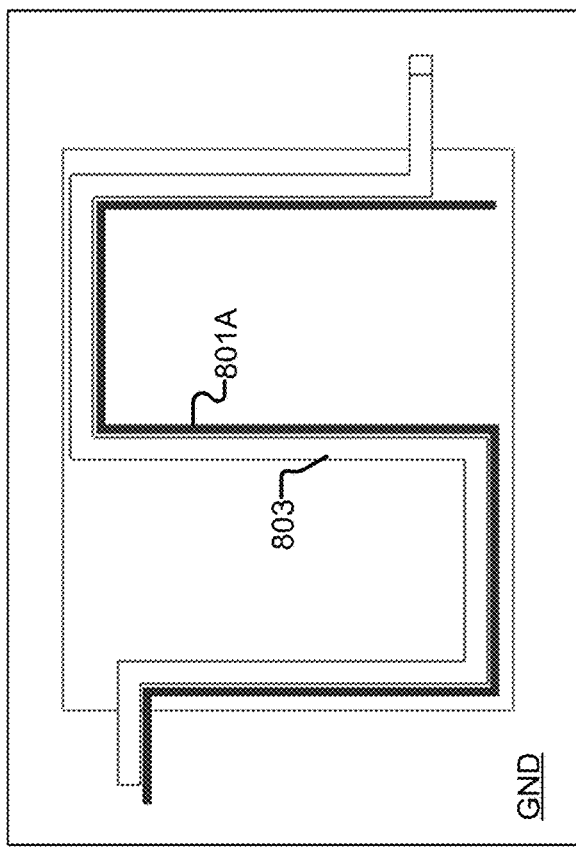
FIG. 8A illustrates a reference plane and a top signal plane of a folded Marchand Balun.
Figure 8D:
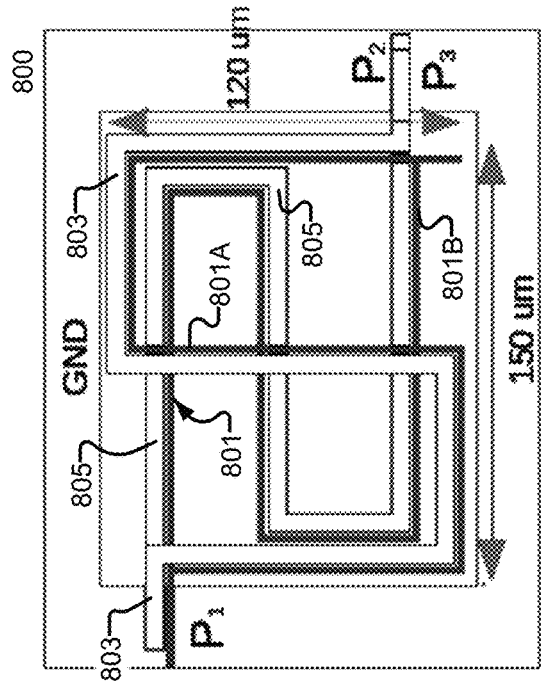
FIG. 8D illustrates a top view of the folded Marchand Balun, according to one embodiment.
Figure 8C:
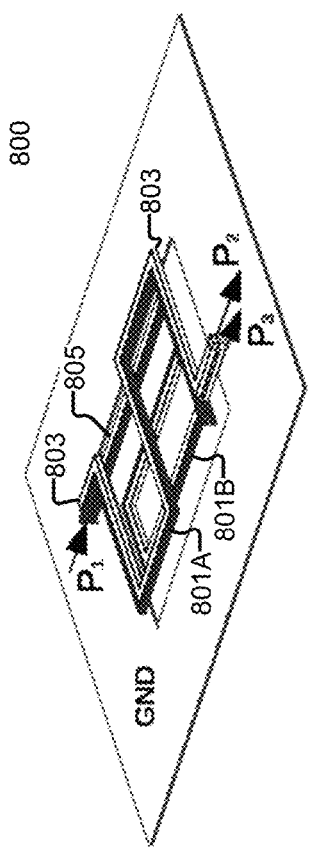
FIG. 8C illustrates a perspective view of the folded Marchand Balun.

FIG. 8A illustrates a reference plane and a top signal plane of a folded Marchand Balun, FIG. 8B illustrates the reference plane and a bottom signal plane of the folded Marchand Balun, FIG. 8C illustrates a perspective view of the folded Marchand Balun, FIG. 8D illustrates a top view of the folded Marchand Balun, according to one embodiment. folded Marchand Balun 800 can represent conventional Marchand Balun 500 of FIG. 5. folded Marchand Balun 800 can be realized by rotating the meandered secondary transmission line and a portion of the primary transmission line of meandered Marchand Balun 700 and folding the rotated portions over the rest of meandered Marchand Balun 700 of FIG. 7A.

Figure 8E:
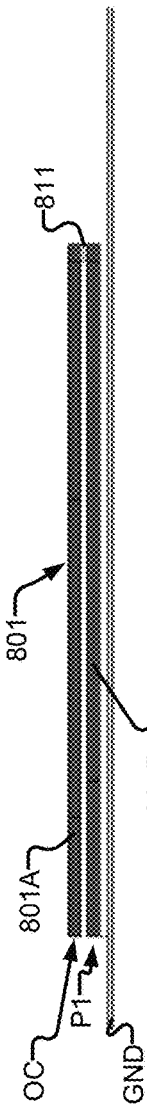
FIG. 8E illustrates a side view of a reference ground and primary transmission line of a folded Marchand Balun.
Figure 8F:
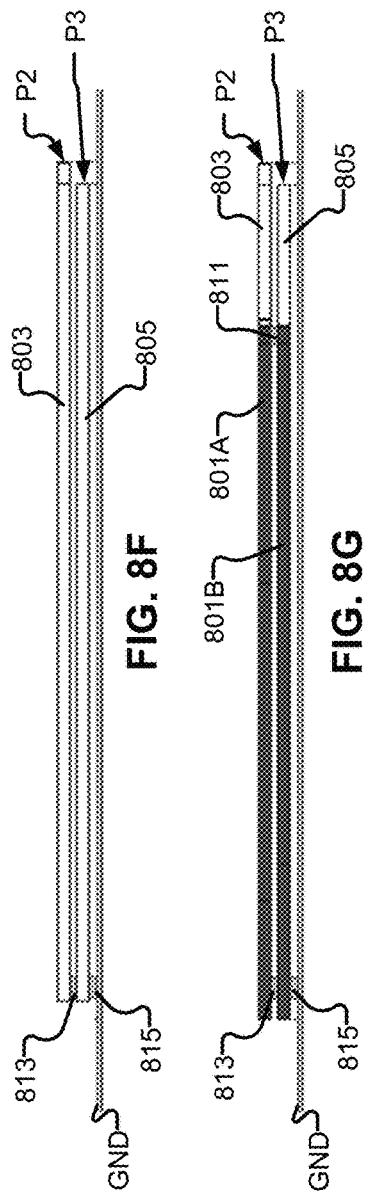
FIG. 8F illustrates a side view of the reference ground and second transmission lines of a folded Marchand Balun.
Figure 8G:
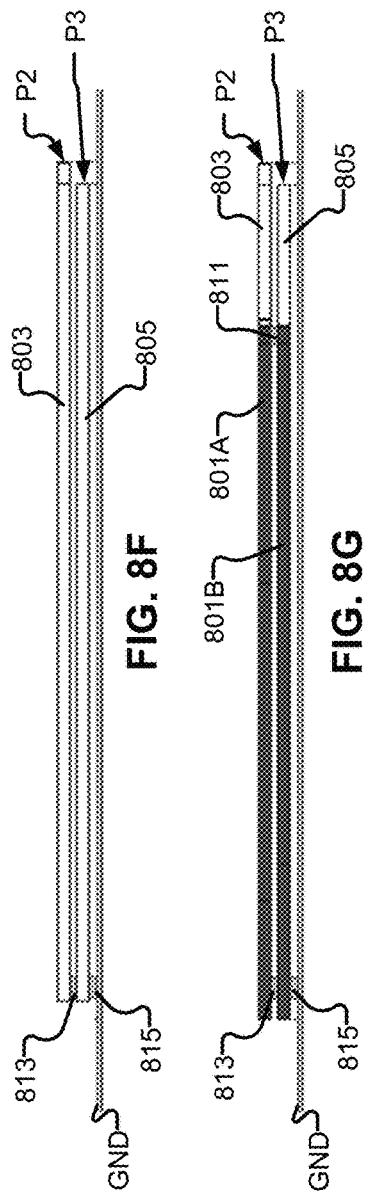
FIG. 8G illustrates a side view of the reference ground and primary/second transmission lines of a folded Marchand Balun, according to one embodiment.

The top and bottom signal layers of the folded Marchand Balun 800 is shown in FIGS. 8A and 8B, respectively, where the top and bottom signal layers are interchangeable. In one embodiment, the signal layers are metal layers. In one embodiment, the reference plane is a substrate or a reference metal plane. Refer to FIG. 8A, the top layer includes a first intermediate transmission line 801A and a first secondary quarter wavelength transmission line 803. FIG. 8A, the top layer includes a second intermediate transmission line 801B and a second secondary quarter wavelength transmission line 805. The first intermediate transmission line 801A and second intermediate transmission line 801A are the two folded portions of the half wavelength primary transmission line 801. In one embodiment, single ended port $P_1$ is at the bottom metal layer, while the differential ports $P_2$ and $P_3$ are at top and bottom layers respectively, as shown in FIG. 8C. In another embodiment, the single ended port $P_1$ is at the top metal layer, while the differential ports $P_2$ and $P_3$ are at bottom and top layers, respectively. The electrical shorting required between the primary transmission lines in two metal layers can be realized through inter-plane or inter-metal vias 811, as shown in FIGS. 8E and 8G. Similarly, the secondary transmission lines 803, 805 are grounded through inter-metal vias 813, 815, as shown in FIGS. 8F-8G. The primary transmission line has an opposite end from the port $P_1$ that is open circuit, e.g., not touching the ground plane. The open circuit and structural supports for any of the transmission lines can be implemented as electrically isolating substrates (such as Silicon dioxide) between the top, bottom, and/or reference ground planes/layers.

Figure 8H:
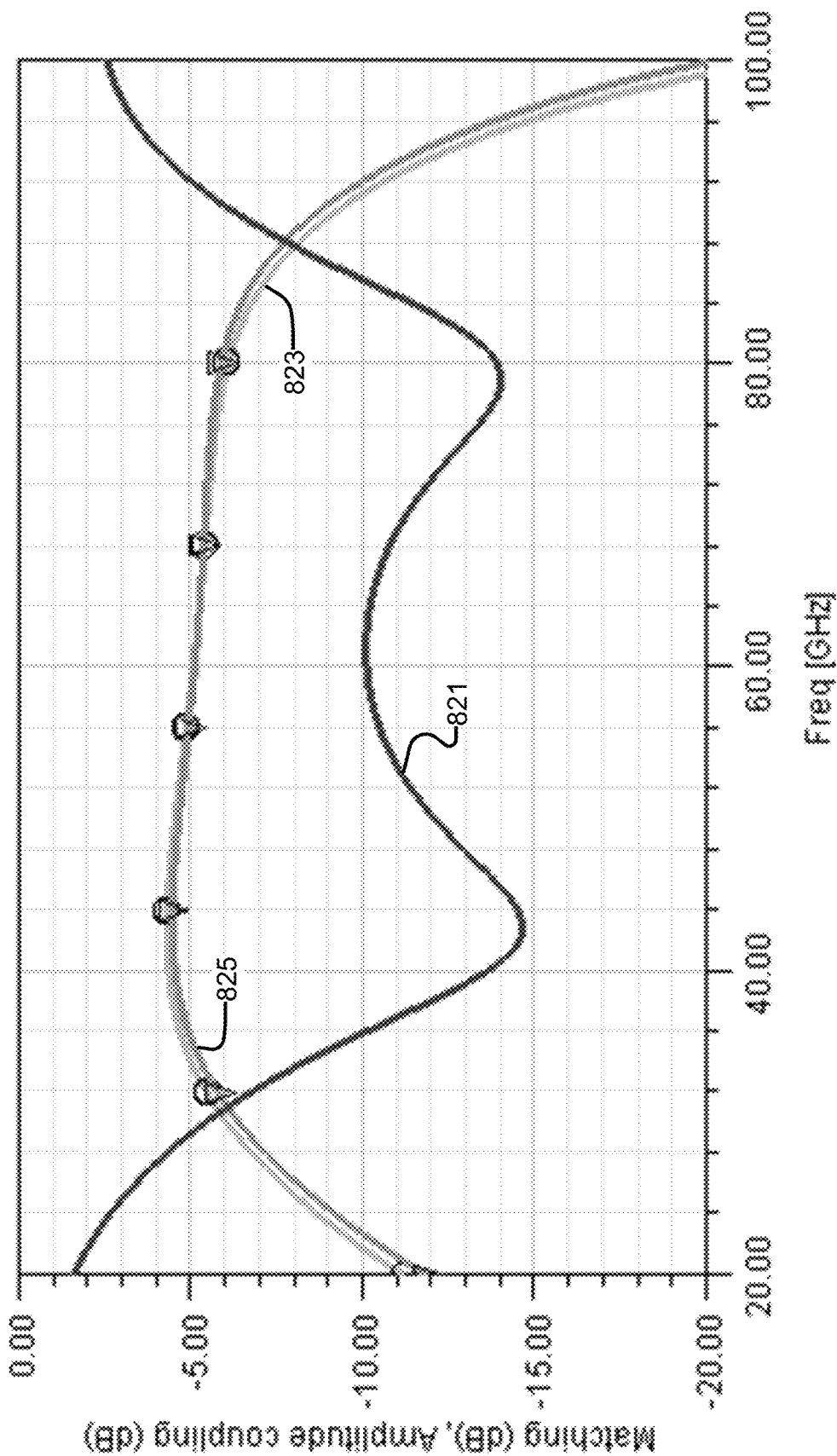
FIG. 8H illustrates matching at port $P_1$ and magnitude coupling from ports $P_1$ to $P_2$ and $P_3$ for the folded Marchand Balun of FIGS. 8A-8G.
Figure 8I:
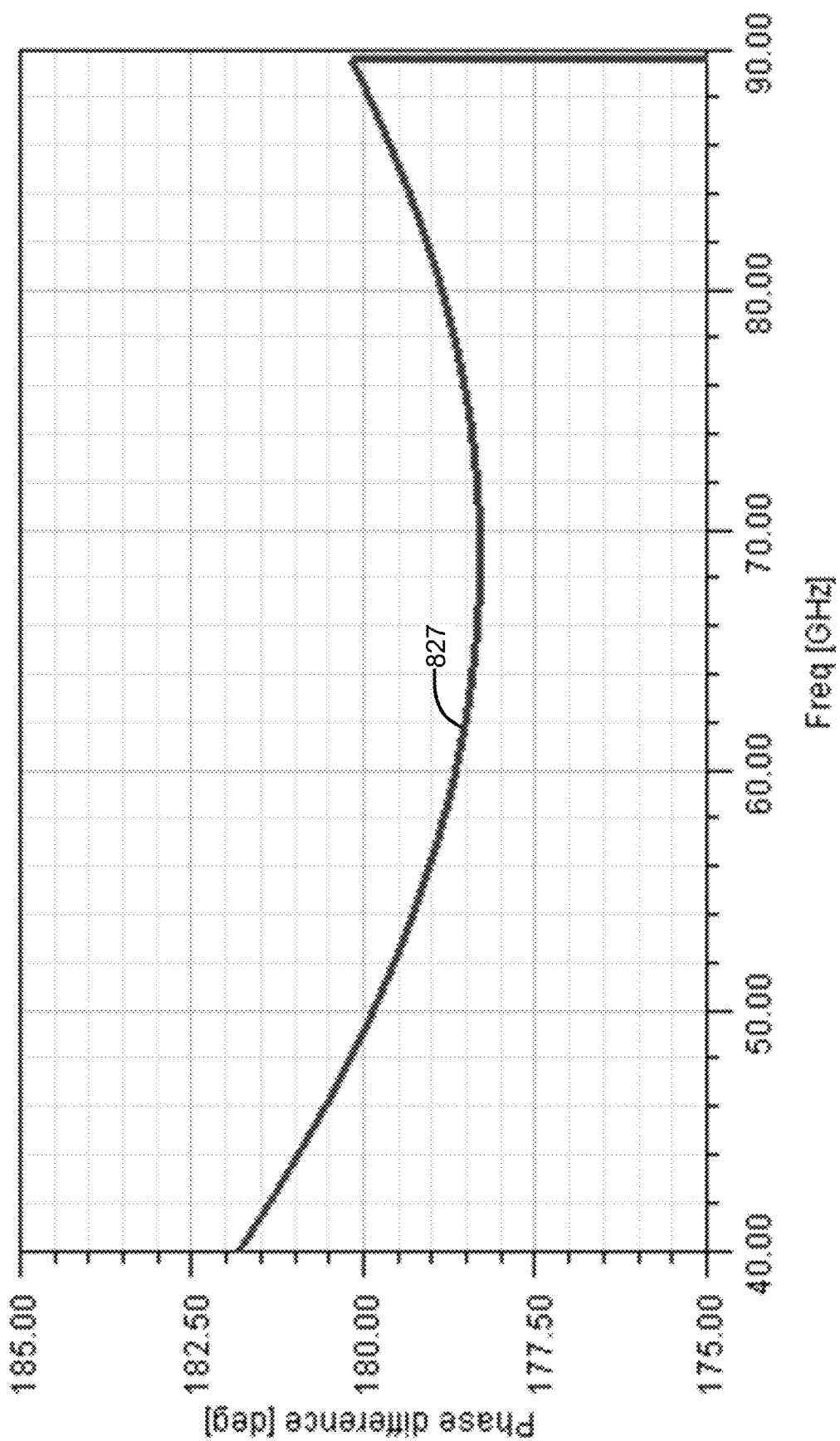
FIG. 8I illustrates phase difference at ports $P_2$ and $P_3$ for the folded Marchand Balun of FIGS. 8A-8G, according to one embodiment.

From simulation results, the folded Marchand Balun 800 of FIG. 8C that is designed for operation from 36 GHz occupies an approximate area of 18,000 um² (120 μm×150 μm) or $0.00026\lambda_0^2$ (as shown in FIG. 8D) which is 40% lower than that of the meandered Marchand Balun 700 of FIG. 7A. The matching bandwidth at $P_1$ 821 is over 80% (36 GHz to 84 GHz) with signal coupling 823 from port $P_1$ to port $P_2$ and signal coupling 825 from port $P_1$ to port $P_3$, as shown in FIG. 8H. The phase difference 827 of signals at differential ports $P_2$ and $P_3$ is shown in FIG. 8I. The simulation results show that the performance characteristics of folded Marchand Balun 800 are minimally degraded.

Figure 9A:
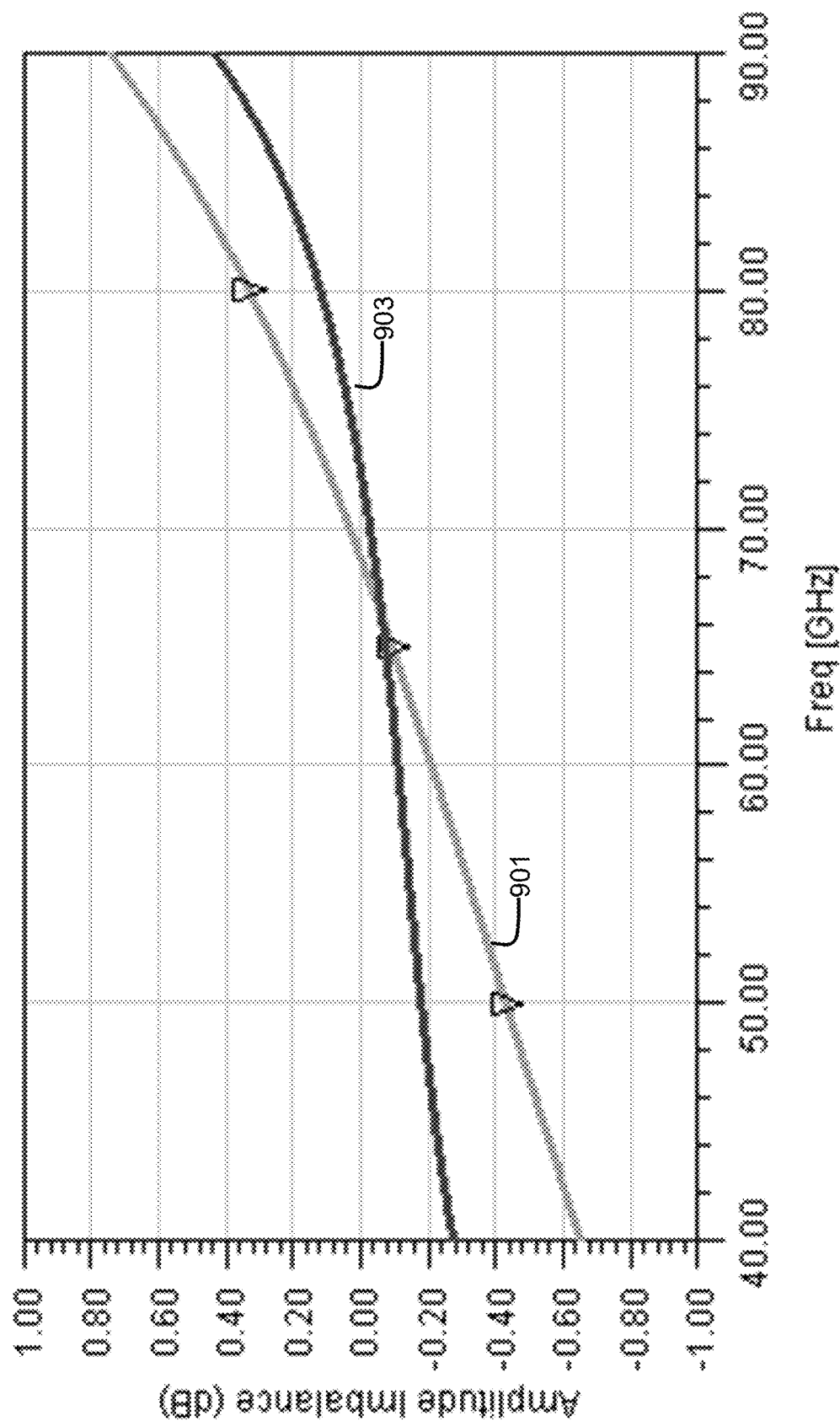
FIG. 9A illustrates simulation of amplitude imbalance for comparison of meandered Marchand Balun of FIG. 7A and folded Marchand Balun of FIG. 8C.
Figure 9B:
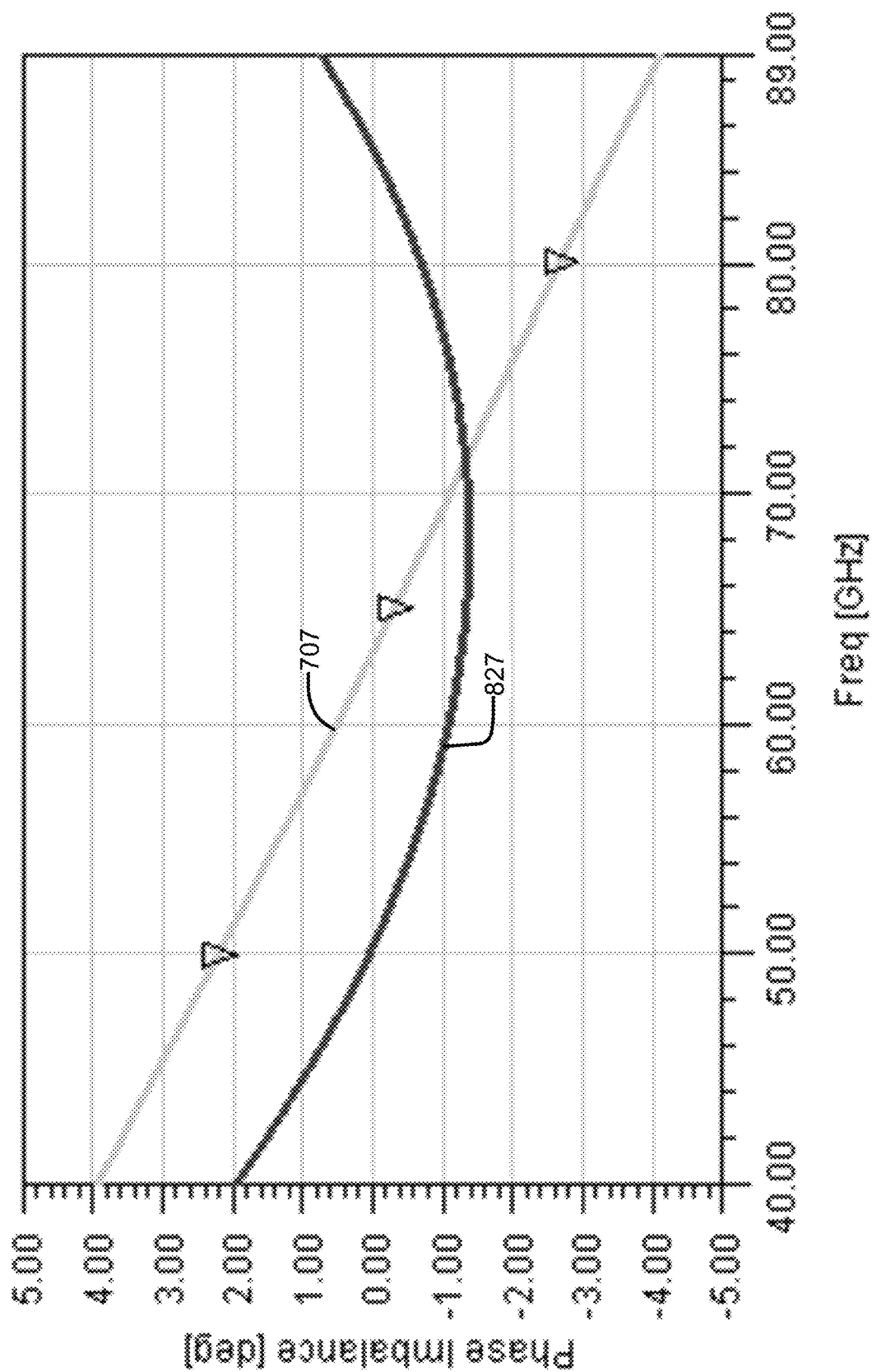
FIG. 9B illustrates simulation of phase imbalance for comparison of meandered Marchand Balun of FIG. 7A and folded Marchand Balun of FIG. 8C, according to one embodiment.

Moreover, the amplitude and phase imbalances of the differential ports $P_2$ and $P_3$ are evaluated for meandered Marchand Balun 700 and folded Marchand Balun 800 and are compared in FIGS. 9A-9B. As shown, amplitude imbalance plot 901 corresponds to meandered Marchand Balun 700 (plot 901 is equal to plot 705 of FIG. 7C subtract plot 703). Amplitude imbalance plot 903 corresponds to folded Marchand Balun 800 (plot 903 is equal to plot 825 of FIG. 8H subtract plot 823). As shown in FIGS. 9A-9B, the amplitude 903 and phase imbalance 827 of folded Marchand Balun 800 is lower than the amplitude 901 and phase imbalance 707 of meandered Marchand Balun 700. The amplitude loss for folded Marchand Balun 800 can be lowered even further by reducing the self-coupling between the folded portions, 801A and 801B, of the primary transmission line and 803 and 805 of secondary transmission line. This can be achieved by increasing the spacing between the lines 801A and 801B (and lines 803 and 805), or by increasing the spacing between the top and bottom plane layers. Henceforth, the wide-band performance along with minimal differential signal imbalance of folded Marchand Balun 800 within a compact space is a promising solution to implement in a wide range of mmW and beyond circuits.

In fact, the implementation of folded Marchand Balun 800 of FIG. 8C can be generalized and is not restrictive to the technology of implementation, operating frequency, or folding configurations. For example, folded Marchand Balun 800 can be implemented in complementary metal oxide semiconductor, printed circuit board, or III-V fabrication technologies, etc. Moreover, other folded Marchand Balun topologies can be implemented. The potential folding configuration of the primary and secondary transmission lines are shown in FIGS. 10A-12C. The GND/reference plane, metal via connections, single-ended and differential ports can be similarly implemented as Marchand Balun 800 but are not illustrated in FIGS. 10A-12C.

Figure 10A:
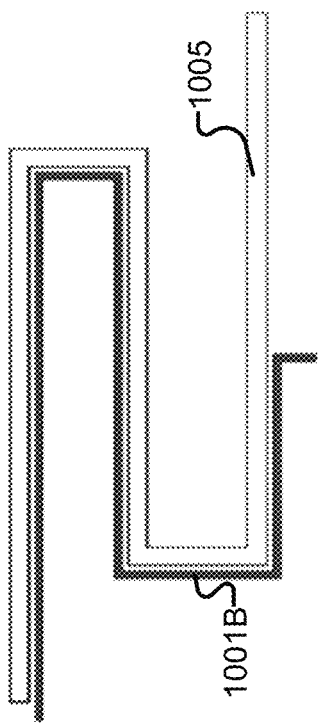
FIG. 10A illustrates a top signal plane of a folded Marchand Balun.
Figure 10B:
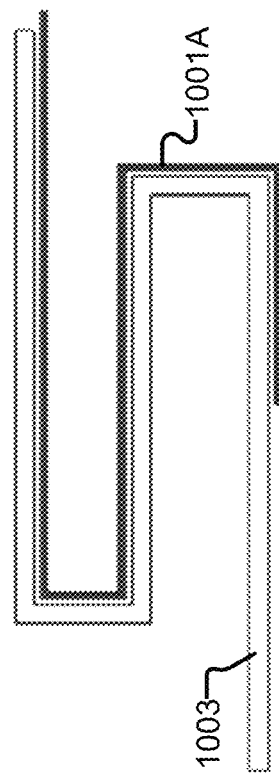
FIG. 10B illustrates a bottom signal plane of the folded Marchand Balun.
Figure 10C:
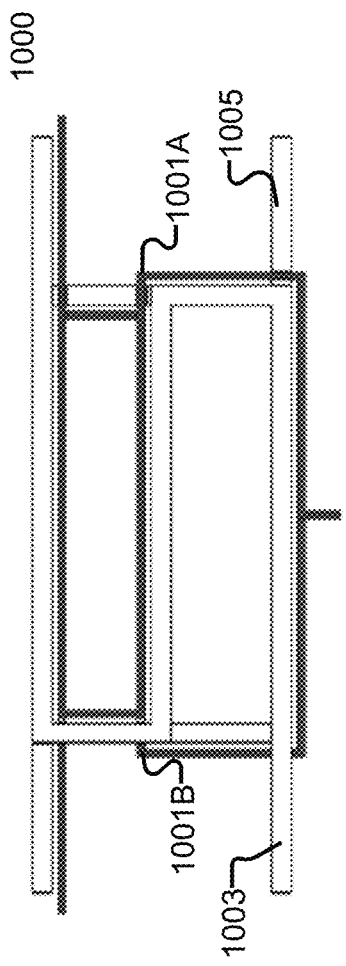
FIG. 10C illustrates a top view of the folded Marchand Balun, according to one embodiment.
Figure 11A:
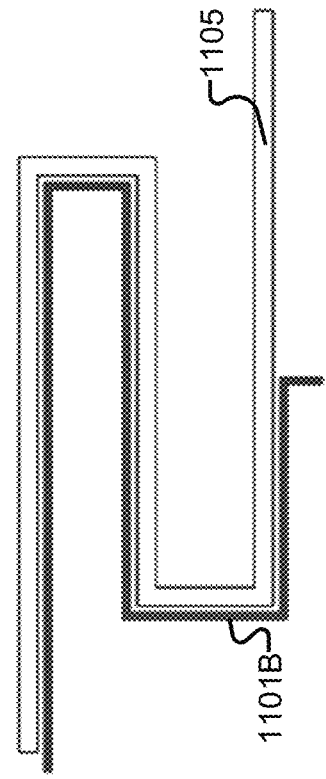
FIG. 11A illustrates a top signal plane of a folded Marchand Balun.
Figure 11B:
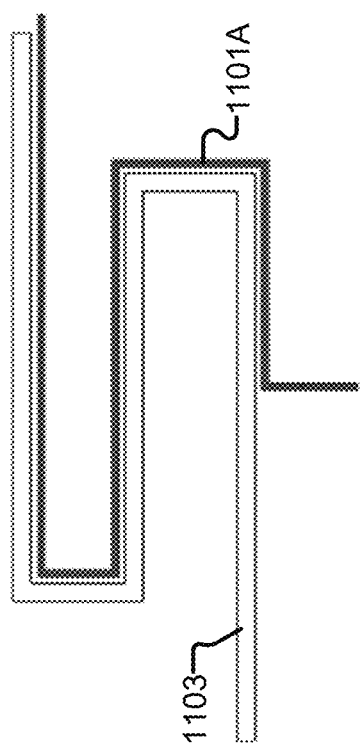
FIG. 11B illustrates a bottom signal plane of the folded Marchand Balun.
Figure 11C:
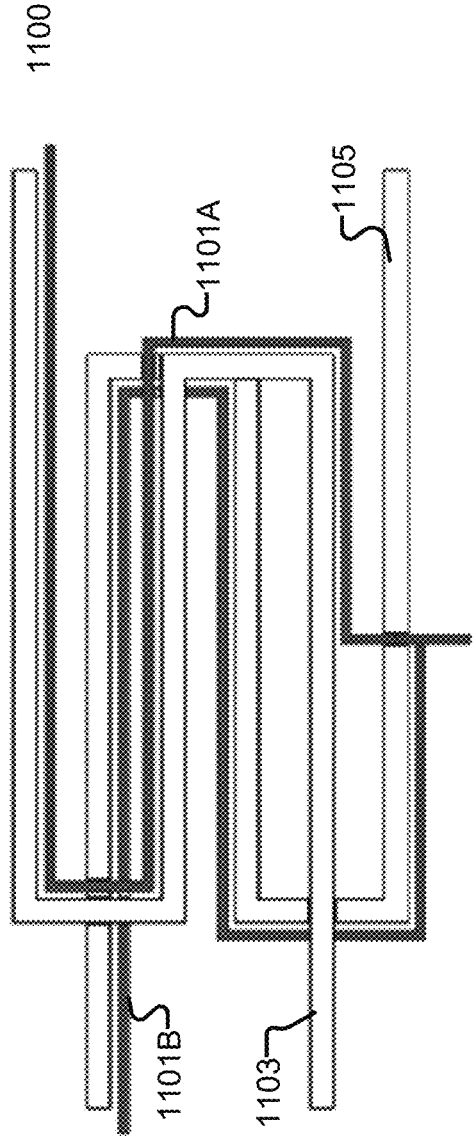
FIG. 11C illustrates a top view of the folded Marchand Balun, according to one embodiment.

FIG. 10A illustrates a top signal plane of a folded Marchand Balun 1000 having first intermediate transmission line 1001A and a first secondary transmission line 1003, FIG. 10B illustrates a bottom signal plane of the folded Marchand Balun 1000 having second intermediate transmission line 1001B and a second secondary transmission line 1005, FIG. 10C illustrates a top view of the folded Marchand Balun 1000, according to one embodiment. FIG. 11A illustrates a top signal plane of a folded Marchand Balun 1100 having first intermediate transmission line 1101A and a first secondary transmission line 1103, FIG. 11B illustrates a bottom signal plane of the folded Marchand Balun 1100 having second intermediate transmission line 1101B and a second secondary transmission line 1105, FIG. 11C illustrates a top view of the folded Marchand Balun 1100, according to one embodiment. FIG. 12A illustrates a top signal plane of a folded Marchand Balun 1200 having first intermediate transmission line 1201A and a first secondary transmission line 1203, FIG. 12B illustrates a bottom signal plane of the folded Marchand Balun 1200 having second intermediate transmission line 1201B and a second secondary transmission line 1205, FIG. 12C illustrates a top view of the folded Marchand Balun 1200, according to one embodiment. The different configurations of the folded Marchand Baluns 1000-1200 vary the meandering, spacings/overlap between the folds of the primary transmission line, and placements of the secondary transmission lines to minimize the footprints of the folded Marchand Baluns 1000-1200. Although the configurations of the folded Marchand Baluns 1000-1200 in FIGS. 10A-12D are shown with implementation of two signal layers, any number of signal layers can be used to realize the folded folded Marchand Balun circuits (e.g., 3 signal layers, 4 signal layers, etc.). In some embodiments, the width of the primary transmission line, and/or the width of the first and second secondary transmission lines can be the same or different. The spacings between the primary (first) and the secondary (second and/or third) transmission lines can be the same or different.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A Marchand Balun, comprising:
a first port, a second port, and a third port;
a first transmission line being folded into a first and a second intermediate transmission lines, the first intermediate transmission line disposed on a first signal plane and the second intermediate transmission line disposed on a second signal plane, wherein a first end of the first intermediate transmission line is coupled to the first port, a first end of the second intermediate transmission line is open circuit, and a second end of the first intermediate transmission line is coupled to a second end of the second intermediate transmission line through inter-plane vias;
a second transmission line disposed on the first signal plane and is adjacent to the first intermediate transmission line, wherein an electromagnetic field generated by the first intermediate transmission line induces a signal in the second transmission line, wherein the second transmission line has one end coupled to the second port and an opposite end coupled to a reference plane; and
a third transmission line disposed on the second signal plane and is adjacent to the second intermediate transmission line, wherein an electromagnetic field generated by the second intermediate transmission line induces a signal in the third transmission line, wherein the third transmission line has one end coupled to the third port and an opposite end coupled to the reference plane.

2. The Marchand Balun of claim 1, wherein the first port is a single-ended port of the Marchand Balun at the first signal plane, the reference plane is a ground for the single-ended port, and the second and third ports are differential ports of the Marchand Balun at the first and second signal planes, respectively.

3. The Marchand Balun of claim 2, wherein the first and second signal planes are interchangeable planes.

4. The Marchand Balun of claim 1, wherein the first transmission line is folded orthogonally, wherein the first intermediate transmission line is substantially orthogonal to the second intermediate transmission line to minimize an electromagnetic coupling between the first intermediate transmission line and the second intermediate transmission line, wherein the second transmission line is substantially orthogonal to the third transmission line.

5. The Marchand Balun of claim 1, wherein the first and second signal planes are metal layers with a first and a second respective height from the reference plane.

6. The Marchand Balun of claim 1, wherein the inter-plane vias comprise a metal via to electrical short the first intermediate transmission line at the first signal plane to the second intermediate transmission line at the second signal plane.

7. The Marchand Balun of claim 1, wherein the second transmission line is shorted to the reference plane through a first metal vias and the third transmission line is shorted to the reference plane through a second metal vias, Wherein, the second and third transmission lines are shorted through same metal vias.

8. The Marchand Balun of claim 1, where the first intermediate transmission line is a portion of the first transmission line in a first orientation and the second intermediate transmission line is a remaining portion of the first transmission line that is folded vertically and rotated in a second orientation.

9. The Marchand Balun of claim 1, wherein the first transmission line and the second or third transmission lines are separated by a substrate to increase the electromagnetic coupling between the first transmission line and the second or third transmission lines.

10. The Marchand Balun of claim 1, wherein the first intermediate transmission line is of a first line width and the second and third transmission lines are of the first line width or a second line width, wherein the first intermediate transmission line is separated from the second transmission line by a first spacing and the second intermediate transmission line is separated from the third transmission line by the first spacing or a second spacing.

11. The Marchand Balun of claim 1, wherein the Marchand Balun is implemented in complementary metal oxide semiconductor, printed circuit board, or III-V fabrication technologies.

12. The Marchand Balun of claim 1, wherein the Marchand Balun is integrated to a mixer, amplifier, or a transmit/receive switch of a receive chain or a transmit chain of a radio frequency transceiver.

13. The Marchand Balun of claim 1, wherein the first transmission line is further folded to a third signal plane, wherein the first, second, and third signal planes are a subset of a plurality of signal planes where the first transmissions line is folded.

14. The Marchand Balun of claim 1, wherein the folding of the first transmission line is used to match an impedance at the first or the second and third ports of the Marchand Balun for an operating frequency.

15. A radio frequency (RF) transceiver comprising:
an antenna;
one or more balanced transmit (Tx) components;
one or more balanced receive (Rx) components;
a transmit/receive switch having a first port coupled to the antenna;
a first Marchand Balun having a single-ended port coupled to a second port of the transmit/receive switch and differential ports coupled to the one or more balanced Rx components; and
a second Marchand Balun having a single-ended port coupled to a third port of the transmit/receive switch and differential ports coupled to the one or more balanced Tx components, wherein the first or second Marchand Balun comprises:
a first port, a second port, and a third port;
a first transmission line being folded into a first and a second intermediate transmission lines, the first intermediate transmission line disposed on a first signal plane and the second intermediate transmission line disposed on a second signal plane, wherein a first end of the first intermediate transmission line is coupled to the first port, a first end of the second intermediate transmission line is open circuit, and a second end of the first intermediate transmission line is coupled to a second end of the second intermediate transmission line through inter-plane vias;
a second transmission line disposed on the first signal plane and is adjacent to the first intermediate transmission line, wherein an electromagnetic field generated by the first intermediate transmission line induces a signal in the second transmission line, wherein the second transmission line has one end coupled to the second port and an opposite end coupled to a reference plane; and
a third transmission line disposed on the second signal plane and is adjacent to the second intermediate transmission line, wherein an electromagnetic field generated by the second intermediate transmission line induces a signal in the third transmission line, wherein the third transmission line has one end coupled to the third port and an opposite end coupled to the reference plane, wherein the first port is the single-ended port of the respective Marchand Balun at the first signal plane, the reference plane is a ground for the single-ended port, and the second and third ports are the differential ports of the respective Marchand Balun at the first and second signal planes, respectively.

16. The RF transceiver of claim 15, wherein the first and second signal planes are interchangeable planes.

17. The RF transceiver of claim 15, wherein the first transmission line is folded orthogonally, wherein the first intermediate transmission line is substantially orthogonal to the second intermediate transmission line to minimize a electromagnetic coupling between the first intermediate transmission line and the second intermediate transmission line, wherein the second transmission line is substantially orthogonal to the third transmission line.

18. A radio frequency (RF) frontend circuit, comprising:
a digital signal processing unit; and
a transceiver coupled to the digital signal processing unit to transmit and receive signals to and from the digital signal processing unit, the transceiver comprising:
an antenna;
one or more balanced transmit (Tx) components;
one or more balanced receive (Rx) components;
a transmit/receive switch having a first port coupled to the antenna;
a first Marchand Balun having a single-ended port coupled to a second port of the transmit/receive switch and differential ports coupled to the one or more balanced Rx components; and
a second Marchand Balun having a single-ended port coupled to a third port of the transmit/receive switch and differential ports coupled to the one or more balanced Tx components, wherein the first or second Marchand Balun comprises:
a first port, a second port, and a third port;
a first transmission line being folded into a first and a second intermediate transmission lines, the first intermediate transmission line disposed on a first signal plane and the second transmission line disposed on a second signal plane, wherein a first end of the first intermediate transmission line is coupled to the first port, a first end of the second intermediate transmission line is open circuit, and a second end of the first intermediate transmission line is coupled to a second end of the second intermediate transmission line through inter-plane vias;
a second transmission line disposed on the first signal plane and is adjacent to the first intermediate transmission line, wherein an electromagnetic field generated by the first intermediate transmission line induces a signal in the second transmission line, wherein the second transmission line has one end coupled to the second port and an opposite end coupled to a reference plane; and
a third transmission line disposed on the second signal plane and is adjacent to the second intermediate transmission line, wherein an electromagnetic field generated by the second intermediate transmission line induces a signal in the third transmission line, wherein the third transmission line has one end coupled to the third port and an opposite end coupled to the reference plane, wherein the first port is a single-ended port of the respective Marchand Balun at the first signal plane, the reference plane is a ground for the single-ended port, and the second and third ports are differential ports of the respective Marchand Balun at the first and second signal planes, respectively.

19. The RF frontend circuit of claim 18, wherein the first and second signal planes are interchangeable planes.

20. The RF frontend circuit of claim 18, wherein the first transmission line is folded orthogonally, wherein the first intermediate transmission line is substantially orthogonal to the second intermediate transmission line to minimize an electromagnetic coupling between the first intermediate transmission line and the second intermediate transmission line, wherein the second transmission line is substantially orthogonal to the third transmission line.

* * * * *